US009254634B2

(12) United States Patent
Arbesman et al.

(10) Patent No.: US 9,254,634 B2
(45) Date of Patent: Feb. 9, 2016

(54) PROCESS FOR MAKING A LAMINATED SHEET

(71) Applicant: R.A. Investment Management S.A.R.L., Luxembourg (LU)

(72) Inventors: Ray Arbesman, Toronto (CA); Nghi Pham, Concord (CA); Winston MacKelvie, Knowlton (CA)

(73) Assignee: R. A. Investment Management S.A.R.L., Luxembourg (LU)

( * ) Notice: Subject to any disclaimer, the term of this patent is extended or adjusted under 35 U.S.C. 154(b) by 0 days.

(21) Appl. No.: 14/568,462

(22) Filed: Dec. 12, 2014

(65) Prior Publication Data
US 2015/0099093 A1    Apr. 9, 2015

Related U.S. Application Data

(63) Continuation of application No. PCT/CA2013/000501, filed on May 23, 2013.

(30) Foreign Application Priority Data

Jun. 18, 2012 (CA) ................................ 2780397

(51) Int. Cl.
*B32B 38/04* (2006.01)
*B32B 37/14* (2006.01)
(Continued)

(52) U.S. Cl.
CPC ............... *B32B 37/144* (2013.01); *B32B 3/266* (2013.01); *B32B 3/30* (2013.01); *B32B 15/046* (2013.01);
(Continued)

(58) Field of Classification Search
CPC .. B32B 38/0004; B32B 3/266; B32B 37/144; B32B 37/203; Y10T 156/1062
USPC .......................................... 156/250, 252, 256
See application file for complete search history.

(56) References Cited

U.S. PATENT DOCUMENTS 1,897,088 A    2/1933  Victor
1,915,221 A    6/1933  Fitzgerald
(Continued)

FOREIGN PATENT DOCUMENTS

CA      1330521 C    7/1994
CA      1337622 C    11/1995
(Continued)

OTHER PUBLICATIONS

International Search Report dated Jul. 15, 2013 for Application No. PCT/CA2013/000501.
(Continued)

*Primary Examiner* — Mark A Osele
*Assistant Examiner* — Christopher C Caillouet
(74) *Attorney, Agent, or Firm* — Patterson & Sheridan, L.L.P.

(57) ABSTRACT

A process is provided for making stiff, lightweight laminate materials. At least one sheet of textured lamina having raised pointed structures is forced against a softer plain lamina so as to embed the structures therein. The pointed structures raised from grooves carved into the surface of the sheet material by means of a set of teeth carried on a knife element. The pointed structures may pierce through the softer lamina such that the protruding tips may be bent over or clinched to prevent their easy withdrawal. Two such texturized lamina may be used to sandwich and pierce through the softer lamina and are co-clinched by the other. In this way a light and stiff laminate is created.

13 Claims, 2 Drawing Sheets

(51) Int. Cl.
- *B32B 3/30* (2006.01)
- *B32B 37/06* (2006.01)
- *B32B 37/08* (2006.01)
- *B32B 37/20* (2006.01)
- *B32B 15/04* (2006.01)
- *B32B 15/06* (2006.01)
- *B32B 15/08* (2006.01)
- *B32B 15/10* (2006.01)
- *B32B 15/18* (2006.01)
- *B32B 3/26* (2006.01)
- *B32B 37/02* (2006.01)
- *B32B 37/10* (2006.01)
- *B32B 38/00* (2006.01)
- *E04C 2/26* (2006.01)
- *E04C 2/292* (2006.01)

(52) U.S. Cl.
CPC .......... *B32B 15/06* (2013.01); *B32B 15/08* (2013.01); *B32B 15/10* (2013.01); *B32B 15/18* (2013.01); *B32B 37/02* (2013.01); *B32B 37/06* (2013.01); *B32B 37/08* (2013.01); *B32B 37/10* (2013.01); *B32B 37/203* (2013.01); *B32B 38/0004* (2013.01); *B32B 38/0012* (2013.01); *B32B 38/04* (2013.01); *E04C 2/26* (2013.01); *E04C 2/292* (2013.01); *B32B 2038/047* (2013.01); *B32B 2250/02* (2013.01); *B32B 2250/03* (2013.01); *B32B 2307/536* (2013.01); *B32B 2311/00* (2013.01); *B32B 2323/04* (2013.01); *B32B 2369/00* (2013.01)

(56) References Cited

U.S. PATENT DOCUMENTS

| | | |
|---|---|---|
| 2,171,530 A | 9/1939 | Balfe |
| 2,255,268 A | 9/1941 | Perrine |
| 3,092,532 A | 6/1963 | Swick et al. |
| 3,170,354 A | 2/1965 | Scholl |
| 3,513,950 A | 5/1970 | Ratcliffe et al. |
| 3,533,891 A | 10/1970 | Puyear |
| 3,551,232 A | 12/1970 | Thompson |
| 3,557,407 A | 1/1971 | Lemelson |
| 3,605,360 A | 9/1971 | Lindal |
| 3,615,994 A | 10/1971 | MacLaine et al. |
| 4,023,613 A | 5/1977 | Uebayasi et al. |
| 4,234,638 A | 11/1980 | Yamazoe et al. |
| 4,552,252 A | 11/1985 | Stahl |
| 4,569,424 A | 2/1986 | Taylor, Jr. |
| 4,640,390 A | 2/1987 | Saumweber et al. |
| 4,705,278 A | 11/1987 | Locacius et al. |
| 4,723,783 A | 2/1988 | Belter et al. |
| 4,776,602 A | 10/1988 | Gallo |
| 4,781,389 A | 11/1988 | Beyer et al. |
| 4,815,172 A | 3/1989 | Ward |
| 4,911,972 A | 3/1990 | Mercuri |
| 4,939,818 A | 7/1990 | Hahn |
| 5,067,210 A | 11/1991 | Keyaki |
| 5,142,743 A | 9/1992 | Hahn |
| 5,143,184 A | 9/1992 | Snyder et al. |
| 5,172,920 A | 12/1992 | Schlenk |
| 5,362,074 A | 11/1994 | Gallo et al. |
| 5,376,410 A * | 12/1994 | MacKelvie .......... 427/290 |
| 5,469,604 A | 11/1995 | Calmettes et al. |
| D374,609 S | 10/1996 | Akeno |
| D376,533 S | 12/1996 | Akeno |
| 5,611,122 A | 3/1997 | Torigoe et al. |
| 5,732,800 A | 3/1998 | Spigener |
| 5,788,247 A | 8/1998 | Tensor |
| D400,427 S | 11/1998 | Okawa et al. |
| 5,842,546 A | 12/1998 | Biswas |
| D425,405 S | 5/2000 | Naohara et al. |
| 6,247,704 B1 | 6/2001 | Battistoni |
| 6,258,457 B1 | 7/2001 | Ottinger et al. |
| 6,276,045 B1 | 8/2001 | Buchi et al. |
| 6,279,222 B1 | 8/2001 | Bunker et al. |
| 6,431,331 B1 | 8/2002 | Arbesman |
| 6,464,047 B1 | 10/2002 | Arbesman |
| 6,622,346 B2 | 9/2003 | Graham et al. |
| 6,671,935 B2 | 1/2004 | Filion et al. |
| 6,843,095 B2 | 1/2005 | Arbesman |
| 6,860,368 B2 | 3/2005 | Kulis, Jr. et al. |
| 6,910,255 B2 | 6/2005 | Arbesman |
| 6,913,673 B2 | 7/2005 | Baggot et al. |
| 7,048,097 B2 | 5/2006 | Arbesman |
| 7,222,701 B2 | 5/2007 | Pham |
| 7,320,386 B2 | 1/2008 | Kulis, Jr. et al. |
| 7,686,142 B2 | 3/2010 | Jung |
| 7,841,052 B2 | 11/2010 | Ducauchuis |
| 7,989,049 B2 | 8/2011 | Potier |
| 8,048,507 B2 | 11/2011 | Townsend et al. |
| 8,088,316 B2 | 1/2012 | Muth et al. |
| D654,355 S | 2/2012 | Cheng |
| 8,407,864 B2 | 4/2013 | Mask et al. |
| 8,683,840 B2 | 4/2014 | Tuma et al. |
| 8,685,520 B2 | 4/2014 | Meyer et al. |
| 2002/0170789 A1 | 11/2002 | Poelemans |
| 2004/0016608 A1 | 1/2004 | Gutowski |
| 2004/0140165 A1 | 7/2004 | Pham |
| 2005/0170157 A1 | 8/2005 | Armela et al. |
| 2006/0027427 A1 | 2/2006 | Anda et al. |
| 2006/0246256 A1 | 11/2006 | Ausen et al. |
| 2008/0003401 A1 | 1/2008 | Barnes et al. |
| 2009/0223753 A1 | 9/2009 | Kappagantu et al. |
| 2010/0170758 A1 | 7/2010 | Chen |
| 2010/0207334 A1 | 8/2010 | Virgin et al. |
| 2011/0051724 A1 | 3/2011 | Scott et al. |
| 2011/0079065 A1 | 4/2011 | Cabanski et al. |
| 2011/0233875 A1 | 9/2011 | Shaver et al. |
| 2011/0260371 A1 | 10/2011 | Arora et al. |
| 2012/0003462 A1 | 1/2012 | Wong |
| 2012/0006959 A1 | 1/2012 | Braun et al. |
| 2013/0152654 A1 | 6/2013 | Arbesman et al. |
| 2015/0053517 A1 | 2/2015 | Arbesman et al. |
| 2015/0086750 A1 | 3/2015 | Arbesman et al. |
| 2015/0099093 A1 | 4/2015 | Arbesman et al. |

FOREIGN PATENT DOCUMENTS

| | | |
|---|---|---|
| CA | 2127339 A1 | 1/1996 |
| CA | 2272115 | 11/1999 |
| CA | 2391183 | 12/2003 |
| CA | 2778455 A1 | 11/2013 |
| CA | 2780397 | 12/2013 |
| CA | 2798303 A1 | 6/2014 |
| CA | 2821897 A1 | 1/2015 |
| DE | 19754740 A1 | 3/1999 |
| DE | 102004048464 A1 | 4/2006 |
| DE | 102006015100 A1 | 10/2007 |
| DE | 102006015145 A1 | 10/2007 |
| DE | 102006015148 A1 | 10/2007 |
| EP | 0859163 A1 | 8/1998 |
| EP | 0934820 A2 | 8/1999 |
| GB | 2507128 A | 4/1926 |
| GB | 2125126 A | 2/1984 |
| WO | 2011051724 A2 | 5/2011 |
| WO | 2013177667 A1 | 12/2013 |
| WO | 2015010183 A1 | 1/2015 |

OTHER PUBLICATIONS

Alba Gaskets—Tanged Graphite data / specification sheet, 1 page, date unknown.

Cixi CAZseal Packing & Gasket Co, Ltd.—Graphite Sheet with Tanged Metal data sheet, 1 page, date unknown.

Dynoteq Kft.—SLT-20 Tang Sheet Specifications data sheet, 1 page, date unknown.

Environmental Gasket Company Ltd.—Graphite Sheet Gaskets, 5 pages, copyright 2009.

Gee Graphite—Tanged Stainless Steel Reinforced Graphite Sheet data sheet, 1 page, date unknown.

(56) References Cited

OTHER PUBLICATIONS

James Walker & Co.—Supagraf Expanded Graphite Jointings data sheet, 1 page, date unknown.

Ningbo Sunwell Fluid Technologies Co., Ltd.—Tanged Metal Reinforced Graphite Gasket data sheet, 1 page, 2010.

SPG Gaskets Co.—Specification Sheet: SPG7003, 1 page, date unknown.

* cited by examiner

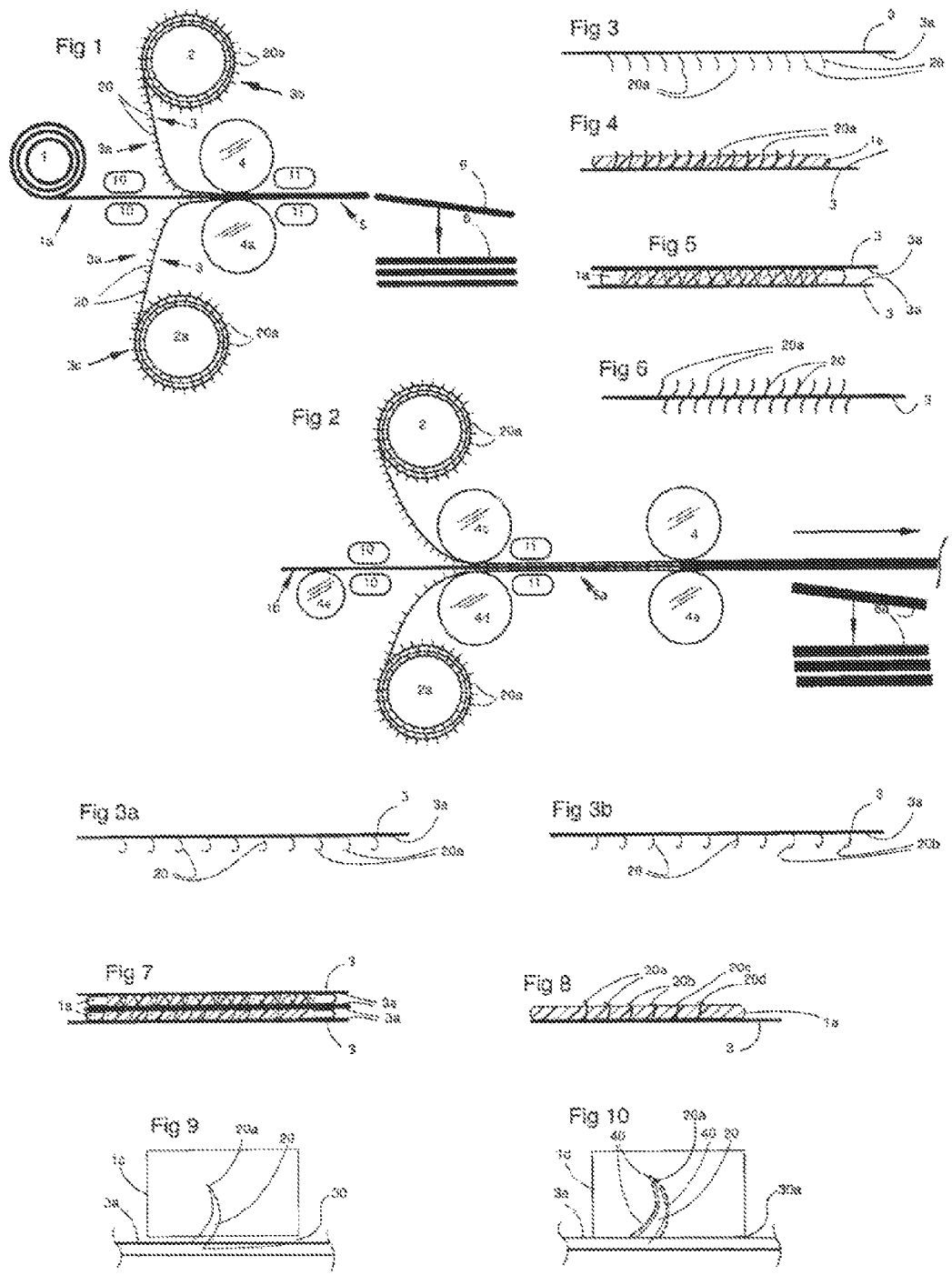

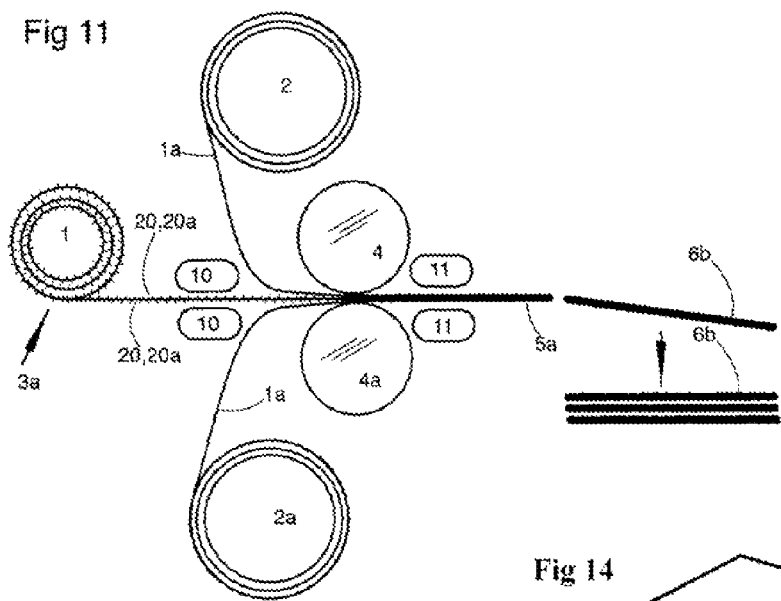
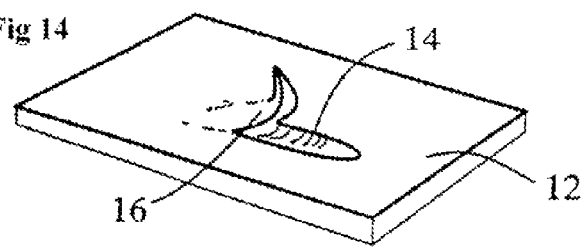
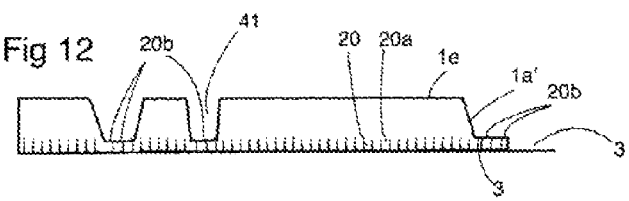
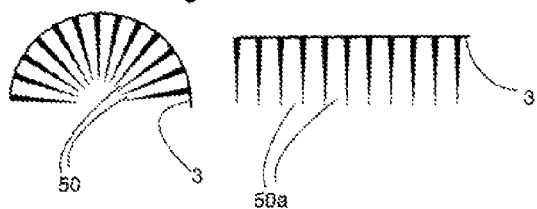

PROCESS FOR MAKING A LAMINATED SHEET

CROSS-REFERENCE TO RELATED APPLICATIONS

This application is a U.S. continuation application under 35 U.S.C. §111(a) claiming priority under 35 U.S.C. §§120 and 365(c) to International Application No. PCT/CA2013/000501, filed May 23, 2013, which claims the priority benefit of Canadian Patent Application No. 2,780,397, filed Jun. 18, 2012, the contents of which are incorporated by reference herein in their entirety for all intended purposes.

FIELD OF THE INVENTION

The invention relates to laminated materials, and more particularly relates to processes for laminating by layering of lamina or plies to produce an improved structural material.

BACKGROUND OF THE INVENTION

There is a growing need for lighter, stiffer, cheaper structural materials, preferably with all three qualities, with which to make better products.

SUMMARY OF THE INVENTION

A laminate is made by combining at least one harder lamina (layer) with at least one softer lamina. In one embodiment, two outer harder lamina are used to sandwich a softer core or centre lamina. The harder lamina(s) are preferably made of a ductile material such as sheet steel. Each such harder lamina has at least one face surface textured such that a myriad of pointed, nail-like, piercing structures rise therefrom. Preferably the textured lamina is not perforated. The core or centre lamina is preferably of a softer, pierceable material such as sheet plastic. One or more of the textured lamina(s) are forced against at least one pierceable lamina so that it is thereby pierced and preferably penetrated through such that the pointed tips of the piercing structures are co-clinched against each other and thereby locking the three lamina together.

According to a first aspect of the invention, a process is provided for making a laminate sheet. At least one face of a sheet of a first relatively hard material is provided with a surface texture having a plurality of raised and generally pointed structures. The textured face of the first material is then brought into contact with a face of a second softer material. The two faces are forced together such that at least some of the pointed structures enter the second material to form a laminate sheet.

Various materials may be used. In one preferred embodiment, the first material has a Brinell hardness of more than about 80, and the second material has a Brinell hardness of less than about 30. Preferably, the first material is a metal (e.g. steel). Preferably, the second material is a plastic, resin, polymer, foam, rubber, wood, or hybrid material.

In one embodiment, the second material is a curable material, in which case, the "forcing" step includes applying the second material in a partially cured state, and then allowing the second material to cure.

The first and second materials may be forced together by passing the laminate sheet (or portions thereof) between rolls. Preferably, the forcing step causes at least the tips of the pointed structures to pierce through the second material, such that the tips protrude at a second face of the second material.

The protruding tips may be deformed to direct them over or onto or into the second face of the second material (e.g. by rolling over the tips with a roller, or by pressing downward on the tips via a second sheet of the first material). The tips may also (but need not) interact with each other (deforming each other by contact, or interengaging together in some embodiments).

The process may involve heating either or both of the first material and the second material prior to forcing the materials together. The materials may be at least partially assembled together in a heated state and then cooled. The second material may be heated to a softened state, prior to partially assembling the second material to the first material in the softened state, and the second material may be then allowed to cool and at least partially harden, prior to further forcing the materials together to form the laminate sheet.

The structures may have a hooked shape. The structures may be pre-bent into a hooked shape.

According to a second aspect of the invention, a continuous process for making laminate sheets is provided. A supply of sheeting of a first relatively hard material with a surface texture having a plurality of raised and generally pointed structures is provided from a continuous roll. The textured face of the first material is brought into contact with a face of a second softer material. The two faces are then forced together such that at least some of the pointed structures enter the second material to form a laminate sheet.

The second material is preferably continuously fed to the first material, and the two materials are forced together downstream of the respective material feeds. Preferably, the second material is continuously rolled onto the first material. The first material may also be cut before the second material is applied (or pre-cut pieces may be provided continuously for laminating—e.g. from a magazine). Alternatively, the laminate sheet may be cut into lengths after the forcing step.

A laminate sheet formed by any of the foregoing processes is also provided.

According to a third aspect of the invention, a laminate sheet is provided. A first relatively hard material with a surface texture having a plurality of raised and generally pointed structures is mated to a second softer material, such that at least some of the pointed structures of the first material protrude into the second material.

At least some of the pointed structures may extend completely through the second material. At least some of the tips of the pointed structures may be turned over, onto or into the second material, so as to retain the first and second materials together.

According to a fourth aspect of the invention, a multi-layer laminate sheet is provided. At least one dual sided sheet forms the core of the laminate. The sheet is of a first relatively hard material and has surface texturing on two faces thereof. The surface texture has a plurality of raised and generally pointed structures. Outer layers of a second softer material are disposed on both sides of the dual sided sheet, the second material being mated to the first material such that at least some of the pointed structures of the first material protrude into the second material.

The multi-layer laminate sheet may also include boundary layers of single sided sheets disposed respectively outside each of the outer layers. Each boundary layer is single sided in that it has a plurality of raised and generally pointed structures on one face thereof (the opposing face is plain). The structures on the face are disposed so as to extend into at least a portion of its corresponding outer layer. (It will be appreciated that laminates of greater complexity may also be provided using this general structure—first boundary layer, core with one or more dual-sided textured sheets, each surrounded on both sides with softer material, second boundary layer.)

In one variant, at least one outer layer has at least one recess for allowing access to the pointed structures. In another variant, one outer layer has at least one relatively thinner area for allowing access to the pointed structures.

BRIEF DESCRIPTION OF THE DRAWINGS

FIG. 1 shows a continuous process of producing a locked laminate sheet from three supply coils, the outer two lamina of having piercing structures and the center lamina being of a softer pierceable material. The three lamina are forced and locked together between pressure rolls which also causes the piercing structures to clinch against the opposing outer lamina. Heaters and/or coolers are shown that may be used to alter material hardness and thus its pierceability.

FIG. 2 shows an embodiment where two sets of pressure rollers are used (e.g. when the core lamina is too hard to be pierced at normal temperatures, or too thick to be pierced through). The first rollers begin the laminating, and the second roll set fully forces the lamina together.

FIG. 3 shows detail of a textured lamina sheet with piercing structures that have a tapered cross-section ending in a pointed tip, populating the surface.

FIG. 3a shows detail of a variation using hooked structures (e.g. for embedment in a fluid core material such as cement or resin).

FIG. 3b shows how the piercing structures can be bent over to form barbed hooks.

FIG. 4 shows the same embodiment where the structures have pierced through the adjacent lamina and where the pointed tips are above its surface.

FIG. 5 shows two such piercing lamina having pierced through the softer core lamina and where the tips have been clinched in the process.

FIG. 6 shows an embodiment of a piercing lamina with both faces textured.

FIG. 7 shows another embodiment of five layer laminate where the two outer lamina have single textured faces and the central textured lamina has both faces textured and where all three textured faces have pierced the adjacent lamina and their pointed tips have been clinched.

FIG. 8 shows detail of the clinching where the tips are sequentially rolled down to the final clinched position on the face of the pierceable lamina.

FIG. 9 shows detail of a single piercing structure mostly embedded in a heat-softened core lamina, which may also be too thick to pierce through.

FIG. 10 shows the same embodiment where the core lamina has been cooled back to hard and lamination completed by additional force causing a slight additional entry of the structure whereby a region of compression is created about the piercing structure to retain it therein.

FIG. 11 shows another embodiment where the core material is the harder piercing lamina textured on both faces and the outer lamina are pierceable and are forced onto the harder core.

FIG. 12 shows how a too-thick lamina may have the pointed structures clinched by providing a recess into the lamina for a punch.

FIG. 13 shows exaggerated short portions of textured material. On right, the material is straight and the piercing structures are generally parallel and at right angle to the surface. On left, is the same portion of material that has been curved to show how the piercing tips must necessarily become non-parallel or convergent, moving closer together. However, if the structures have pieced into a solid lamina (not shown), the tips are thereby locked in position and unable to move relative to each other. This imparts a high degree of stiffness to the laminate.

FIG. 14 shows a fragment of a workpiece showing a single cutting planed from a trough in a surface of the workpiece.

DETAILED DESCRIPTION

In the following description the word "clinch" (clinching, clinchable, clinched), is used to describe the act of bending over the exposed tip of a pin- or nail that has pierced through two or more layers and extends therefrom. Clinching is common practice in the wood construction trade. Clinching is analogous to riveting in metal work, or to any other deformation of a fastener to prevent its easy withdrawal. The purpose of clinching is to impart greater cohesion between the two laminate layers that are so joined.

The term "pointed structure" or "pointed structures" is used herein as a general term to describe any type of nail- or pin-like structure (or hooked or barbed structure) raised on the surface of a material (for embedding or piercing). "Piercing structure" is one embodiment where the structure is formed to pierce through a softer material in the laminating process.

The term "pointed structure" or "pointed structures" is used herein as a general term to describe any type of nail- or pin-like structure (or hooked or barbed structure) raised on the surface of a material (for embedding or piercing). "Piercing structure" is one embodiment where the structure is formed to pierce through a softer material in the laminating process.

In the instant invention pointed (e.g. piercing) structures have been raised from a surface of a harder lamina material. Preferably, they can pierce into an adjacent softer lamina and if longer than the soft lamina's thickness, can protrude. The protruding tips may be bent over or clinched to create the 'locked-laminate' embodiment of the instant invention. This piercing through and clinching brings the unexpected benefits of extraordinary stiffness to the resulting laminate.

FIG. 1 shows a process for making a continuous locked-laminate material. Coil 1 supplies the first lamina 1a of softer pierceable material, such as polyethylene, which will become the core lamina. Coils 2 and 2a supply the outer second lamina 3b and outer third lamina 3c of harder material each having one face 3a textured with piercing structures 20. The three lamina layers are fed between pressure rolls 4, 4a. Under pressure from rolls 4, 4a, the piercing structures of the two outer laminas 3b, 3c penetrate through the core lamina 1a and are clinched by the opposite outer lamina, continuously locking the three lamina together which can then be severed into individual sheets 6 of locked-laminate. Alternatively, the laminate 5 may be collected as a bulk product on a take-up reel (not shown) (thus, the process may be a coil-to-coil process). The bulk product may be further cut or shaped for specific applications, including cut-to-measure applications on a job site.

Rolls 4, 4a can press against the entire width of the material "sandwich" or just in localized areas (e.g. edges).

If lamina 1a is too hard to be readily pierced and/or too thick for the piercing structures 20 to extend completely through it, heaters 10 may be used to soften the material. Coolers 11 may then be used to cool the laminate strip 5 prior to cutting into laminate sheets 6.

In another embodiment, stiff, sheet core lamina 1b, such as polycarbonate, shown in FIG. 2, may be similarly laminated between the outer textured lamina as described above, but with a variation comprising using heaters 10 to enable partial piercing leaving a small contact gap of, say, 5% of structure height, between each lamina after passing through first rollers 4c, 4d. Coolers 11 then return the lamina 1a to a harder state after which second rollers 4, 4a complete the piercing and bring full contact. In this way the piercing structures are forced a short distance into the too-stiff or too-thick core lamina whereupon a region of considerable compressive tension is created about each piercing structure and resulting in an unexpected retention force. Since these structures naturally have a tapered cross-section, a secondary taper-fit retention (well known in the mechanical field) is achieved adding further retentive strength. This all results in an exceptionally rigid, low-cost laminate suitable for a wide range of uses. The sheets may be cut into shorter laminate pieces 6a.

In FIG. 3 is shown the textured face 3a and plain face 3 of harder outer lamina 3b, 3c which may be the same or of different materials such as steel-steel or steel-aluminum. Piercing structures 20 have piercing, pointed tips 20a. In FIG. 4 the tips 20a are shown to pierce through lamina 1a and extend thereabove. FIG. 3a shows that the structures can have a hook shape. For example, the hooks may be inherently formed in the initial process to prepare the textured outer lamina (for example, using the process described in co-pending application "Bulk Textured Material Sheeting", Canadian Patent Application No. TBA, of the same applicants, filed in Canada on May 29, 2012; or the process described for example in any of Canadian Patent Nos. 1,330,521; 1,337,622; or 2,127,339, the disclosures of all of which are incorporated herein by reference). According to one embodiment, the initial process used to prepare the textured outer lamina that inherently forms the hooks is a technique disclosed in Canadian Patent No. 2,127,339 that is applicable to readily machinable material, which is defined in the context of the embodiments of the invention as a material from which a cutting blade may plane or gouge a continuous cutting or shaving which can be smoothly curled out of the cutting plane without fracture. For example, by reference to the enlarged fragmentary view in FIG. 14, a tongue 16 (also referred to herein as a "pointed structure" according to one embodiment) is planed or gouged out of a surface 12 from a trough 14 which initially increases in depth as a forming tool (e.g. forming tool 24 as shown in FIGS. 9 and 10 of Canadian Patent No. 2,127,339) penetrates the surface 12 to a depth during translational movement and then continues at a substantially constant depth as the translational movement of a cutting edge of the forming tool continues, the resulting cutting being deflected in a curved path up a surface of the forming tool so as to form the tongue 16. Alternatively, more straight upright (e.g. nail-like) structures may be pre-bent into more hook-shape structures. Such pre-bending can be done using rollers or a press arrangement between flat platens so as to bend the thinner tips over into hooks. The hook shape provides a means to engage or attach the textured surface 3a to a flowable-type core material after which it solidifies encasing the hooks. For example such an arrangement can be used to secure the textured face 3a to an applied, non-cured or non-solid materials such as cements, resins, melted polymers, adhesives and the like. In so doing a thicker core material 1a can be used since the clinching does not require that the core be pierced through.

FIG. 3b shows how the structure tips 20a can be further formed or bent over to form retroverted hooks or barbs 20b. Such barbs can be used to advantage to engage fabrics, soft lamina, and to be forced into heated lamina. The barb shape is well known to resist removal which adds another locking action to the instant lamination invention.

In FIG. 5 two harder outer lamina's structures are shown to have pierced right through core lamina 1a such that their tips have been clinched by pressure against the opposing outer lamina creating the locked-laminate of the instant invention. FIG. 6 shows the harder lamina 3 with both faces textured with piercing structures such that it will be the core between two softer outer lamina (e.g. as shown in FIG. 7). In FIG. 7 the same double textured lamina is shown as a core lamina with softer pierceable lamina on either side and with outer harder textured lamina on the outside creating a five layer lamination which can all be clinched together.

FIG. 8 shows only two lamina for clarity of the progression of the tips 20a being clinched while passing between rollers to the fully clinched tip 20b by being pressed together against a hard third surface such as an anvil. Also shown in FIG. 8 are examples of how the tips may be reverted 20c so as to be pointing pack into the lamina, and crushed 20d where the effect is akin to riveting.

FIGS. 9 and 10 show a detail of one piercing structure 20 on lamina 3a engaged almost fully into pre-softened lamina 1c leaving a small contact gap 30 therebetween. After second pressing, post-hardened lamina 1d (lamina 1c is cooled to normal hardness) is pierced an additional distance to close the contact gap and create a 'compressive tension envelope' 40 about the entire structure. This of course applies to all structures in such a lamination process.

FIG. 11 shows the rolling lamination process applied to a core of double-textured harder lamina 3a with softer outer lamina 1a which outer lamina may be of the same or different materials and thickness.

In FIG. 12 is shown two different methods of clinching when too-thick laminate prevents the tips from protruding. Flange 1a' provides a thinner edge portion through which the piercing structures can emerge to be clinched. Recess or cavity 41 into thicker lamina 1e also provides the same access to the tips for clinching. A clinching tool (e.g. small roller or platen) may be pressed down into the recess 41 or at the thinner edge to locally clinch the exposed piercing structures. In this way, specific areas of the laminate may be clinched and other areas not.

In FIG. 13 is shown a section of harder lamina 3 with exaggerated piercing structures having a generally parallel disposition at right angles to the lamina face. When this same section is curved, the structure tips must necessarily remain at right angles to the textured lamina which they are intrinsic with, and protrude from, and so their tips are shown to move together or converge at least somewhat. If however the illustrated section is part of the locked lamination materials detailed above, the tips are locked in position preventing their convergence which, in turn, imparts a high degree of resistance to be bending where each structure adds resistance to bending. In this way an exceptionally stiff laminate is created from relatively non-stiff lamina. When the tips are clinched, a further substantial increase in strength is realized from the pull-apart or peel resistance that is thereby imparted to the lamination.

Such locked-laminate material may then be formed using different known fabrication methods including bending, drawing, punching, and the like. Such fabrication methods may be augmented by heating the laminate to allow the structure's tips 50a to move through the softened lamina to their new angular relationship (FIG. 13), and then be locked there when the lamina cools back to normal hardness returning the desired stiffness to the now-formed laminated sheet.

Although the foregoing description refers to three- and more-ply laminates, it will be appreciated that simple two-ply laminates can be created using one harder (textured) material and one softer (pierceable) material, using the same roller arrangement described above (with suitable modifications) to "lock" the material together.

The foregoing description illustrates only certain preferred embodiments of the invention. The invention is not limited to the foregoing examples. That is, persons skilled in the art will appreciate and understand that modifications and variations are, or will be, possible to utilize and carry out the teachings of the invention described herein. The scope of the claims should not be limited by the preferred embodiments set forth in the examples, but should be given the broadest purposive construction consistent with the description as a whole.

The invention claimed is:

1. A process for making a laminate sheet, comprising:
   providing a sheet of a first material, the sheet having at least one textured face textured with a plurality of generally pointed structures that have been raised from the sheet;
   bringing the textured face of the first material into contact with a face of a second material; and
   forcing the textured face and the face together such that at least some of the pointed structures enter the second material to form a laminate sheet, wherein the forcing step causes at least the tips of the pointed structures to pierce through the second material, such that the tips protrude at a second face of the second material; and
   deforming the protruding tips to direct them over or onto or into the second face of the second material, wherein the tips are deformed by pressing downward on the tips via a second sheet of the first material.

2. The process of claim 1, wherein the first material is a metal.

3. The process of claim 1, wherein the first material is steel.

4. The process of claim 1, wherein the second material is at least one of a plastic, a resin, a polymer, a foam, a rubber, a wood, and a hybrid material.

5. The process of claim 1, wherein the pointed structures are gouged out of the textured face of the sheet.

6. The process of claim 1, wherein the second material is a curable material.

7. The process of claim 6, wherein the forcing step includes applying the second material to the first material in a partially cured state, and then allowing the second material to cure.

8. The process of claim 1, wherein the first material has a Brinell hardness of more than about 80, and the second material has a Brinell hardness of less than about 30.

9. The process of claim 1, further comprising heating either or both of the first material and the second material prior to forcing the materials together.

10. The process of claim 9, wherein the forcing step comprises at least partially assembling the materials together in a heated state and then cooling the assembled materials.

11. The process of claim 9, wherein the second material is heated to a softened state, and the forcing step comprises partially assembling the second material to the first material in the softened state, allowing the second material to cool and at least partially harden, and then further forcing the materials together to form the laminate sheet.

12. The process of claim 1, wherein the pointed structures are pre-bent into a hooked shape.

13. The process of claim 1, wherein the pointed structures have a nail-like shape.

* * * * *